(12) United States Patent
Kirchhoff et al.

(10) Patent No.: US 7,091,302 B2
(45) Date of Patent: Aug. 15, 2006

(54) PROCESS FOR THE PREPARATION OF POLYCARBONATE

(75) Inventors: Jörg Kirchhoff, Köln (DE); Thomas König, Leverkusen (DE); Klemens Kohlgrüber, Kürten (DE); Steffen Kühling, Meerbusch (DE); Melanie Möthrath, Düsseldorf (DE); Dirk Van Meirvenne, Krefeld (DE)

(73) Assignee: Bayer Materialscience AG, Leverkusen (DE)

( * ) Notice: Subject to any disclaimer, the term of this patent is extended or adjusted under 35 U.S.C. 154(b) by 0 days.

(21) Appl. No.: 11/105,678

(22) Filed: Apr. 14, 2005

(65) Prior Publication Data

US 2005/0239995 A1    Oct. 27, 2005

(30) Foreign Application Priority Data

Apr. 21, 2004 (DE) ...................... 10 2004 019 295

(51) Int. Cl.
*C08G 64/00* (2006.01)
(52) U.S. Cl. .................. 528/196; 516/11; 521/93; 521/95; 521/96; 528/198; 422/131
(58) Field of Classification Search .................. 516/11; 521/93, 95, 98; 528/196, 198; 422/131
See application file for complete search history.

(56) References Cited

U.S. PATENT DOCUMENTS

| | | | | |
|---|---|---|---|---|
| 5,852,156 | A | 12/1998 | Hachiya et al. | 528/196 |
| 5,861,474 | A | 1/1999 | Weller et al. | 528/501 |
| 6,214,897 | B1 * | 4/2001 | Tung et al. | 521/138 |
| 6,265,526 | B1 | 7/2001 | Komiya et al. | 528/196 |
| 6,320,015 | B1 | 11/2001 | Komiya et al. | 528/196 |
| 6,462,165 | B1 | 10/2002 | Ito et al. | 528/196 |
| 2003/0176622 | A1 * | 9/2003 | Konishi et al. | 528/196 |
| 2005/0049393 | A1 * | 3/2005 | Silvi et al. | 528/481 |

* cited by examiner

*Primary Examiner*—Terressa Boykin
(74) *Attorney, Agent, or Firm*—Joseph C. Gil; Aron Preis

(57) ABSTRACT

The invention describes a process for the preparation of polycarbonate. The process includes
(a) transesterifying at least one aromatic dihydroxyaryl compound and a diaryl carbonate in the melt in the presence of a catalyst,
(b) mixing the melt obtained in step (a) with a foaming agent
(c) passing the mixture at 250 to 340° C. through inlet openings of a separating vessel at a rate of 0.1 to 20 kg/hour, to obtain a plurality of streams of foamed polycarbonate and degassing the streams of foamed polycarbonate in the separating vessel wherein the pressure is 0.1 to 20 mbar.

8 Claims, 2 Drawing Sheets

PROCESS FOR THE PREPARATION OF POLYCARBONATE

FIELD OF THE INVENTION

The invention relates to a process for the preparation of polycarbonate and more particularly to the transesterification process.

BACKGROUND OF THE INVENTION

The preparation of aromatic oligocarbonates/polycarbonates by the melt transesterification process is sufficiently well known and has been described, for example, in Encyclopedia of Polymer Science, Vol. 10 (1969), Chemistry and Physics of Polycarbonates, Polymer Reviews, H. Schnell, Vol. 9, John Wiley and Sons, Inc. (1964) as well as in DE-C 10 31 512.

Because of the chemical equilibrium reaction, the transesterification process always yields products having a high content of residual monomers, i.e. of monohydroxyaryl compounds, dihydroxyaryl compounds and diaryl carbonates. Thus, in the case of polycarbonates having a low content of hydroxyl end groups, a higher content of diaryl carbonates and a lower content of monohydroxyaryl and dihydroxyaryl compounds is measured than in the case of polycarbonates having a higher content of hydroxyl end groups. In the latter case, the content of diaryl carbonates is lower but the content of monohydroxyaryl and dihydroxyaryl compounds is higher. It is further observed that the residual monomer content falls as the molecular weight increases. The residual monomers are removed from the melt in particular by degassing.

A low content of residual monomers is desirable because residual monomers lead to coatings on the molds of the processing machines during the processing of the polycarbonates. Moreover, the heat stability of residual monomers is low, so that polycarbonates having a high residual monomer content exhibit poorer properties in respect of heat stability. Furthermore, residual monomers have an adverse effect on the mechanical breaking behavior of the polycarbonate. For selected applications, such as, for example, in the foodstuffs or medical sector, residual monomers are regarded as troublesome and undesirable.

In the case of polycarbonate prepared by the melt transesterification process, the greatest proportion of residual monomers is frequently the diaryl carbonate component, especially diphenyl carbonate. It is therefore desirable when removing volatile constituents to remove these components in particular. A particularly large amount of the diaryl carbonate component forms at relatively low molecular weights at relative viscosities of from 1.18 to 1.22, as are preferably used for optical data carriers.

A further problem is the re-formation of the low molecular weight constituents, such as, for example, hydroxyaryl compounds, dihydroxyaryl compounds and carbonic acid diesters, from the polycarbonate by chemical reaction during the degassing, which makes degassing considerably more difficult.

Various processes are known for preparing polycarbonate by the melt transesterification process with subsequent removal of residual monomers by means of an additional degassing step. It is preferable in these processes to reduce the residual catalyst activity in the polycarbonate before the degassing. The reduction in the activity of the catalyst is preferably effected by the addition of acidic components as inhibitors, such as, for example, phosphoric acid, sulfuric acid, sulfurous acid, toluenesulfonic acid.

The addition and mixing in of such components that reduce the catalyst activity require an increased technical outlay. Furthermore, the mentioned components frequently have a highly corrosive action towards the materials from which the apparatus for carrying out the polymerization and degassing are usually produced.

In addition, the added components, such as, for example, phosphoric acid, may be separated from the polycarbonate with the other volatile constituents in the subsequent degassing step, accumulate in the installation and lead to damage to the installation as a result of corrosion. When the volatile constituents, including the catalyst-inhibiting component, that have been separated off are fed back into the circuit of the installation again, adverse effects on the implementation of the reaction are additionally to be expected, because the catalyst-inhibiting component can in this way inhibit the progress of the polymerization reaction.

A further problem in the preparation of polycarbonate by the melt transesterification process is that the residence time in the degassing stage under reduced partial pressure is too long. If the melt is sufficiently reactive, this may lead to a considerable increase in the molecular weight in the degassing step, which is undesirable for the degassing.

U.S. Pat. No. 5,852,156 describes a process for the preparation of polycarbonate by the melt transesterification process, in which the melt is passed under a stream of nitrogen, but not with foaming, through a zone of low pressure. The residence time in this zone is increased because the melt does not fall freely but flows downwards along vertically arranged wires. A considerable increase in the molecular weight during the degassing step is observed in this process.

EP 1 095 957 A and EP 1 095 960 A describe a process similar to that of U.S. Pat. No. 5,852,156. An inert gas is dissolved in an oligomer melt. The melt is then relieved into a zone under low pressure, with foaming. The foaming effects the removal of reaction products, so that the polymerization is able to progress. The residence time is lengthened by means of vertically arranged wires, as a result of which the molecular weight increases markedly in the degassing step. Heating of the melt before it is relieved is not provided.

EP 914 355 A describes the introduction of a separating agent of limited solubility and the subsequent relieving, optionally with foaming, of the polymer solution into a separator under low pressure.

SUMMARY OF THE INVENTION

A process for producing polycarbonate is disclosed. The process entails (a) reacting in the melt at least one aromatic dihydroxy compound with diaryl carbonate in the presence of a catalyst to obtain polycarbonate melt, and (b) mixing the polycarbonate melt with a foaming agent to obtain a mixture and (c) passing the mixture at 250 to 340° C. through inlet openings of a separating vessel at a rate of 0.1 to 20 kg/hour, to obtain a plurality of streams of foamed polycarbonate and degassing the streams of foamed polycarbonate in the separating vessel wherein the pressure is 0.1 to 20 mbar.

DETAILED DESCRIPTION OF THE INVENTION

Figure 1:
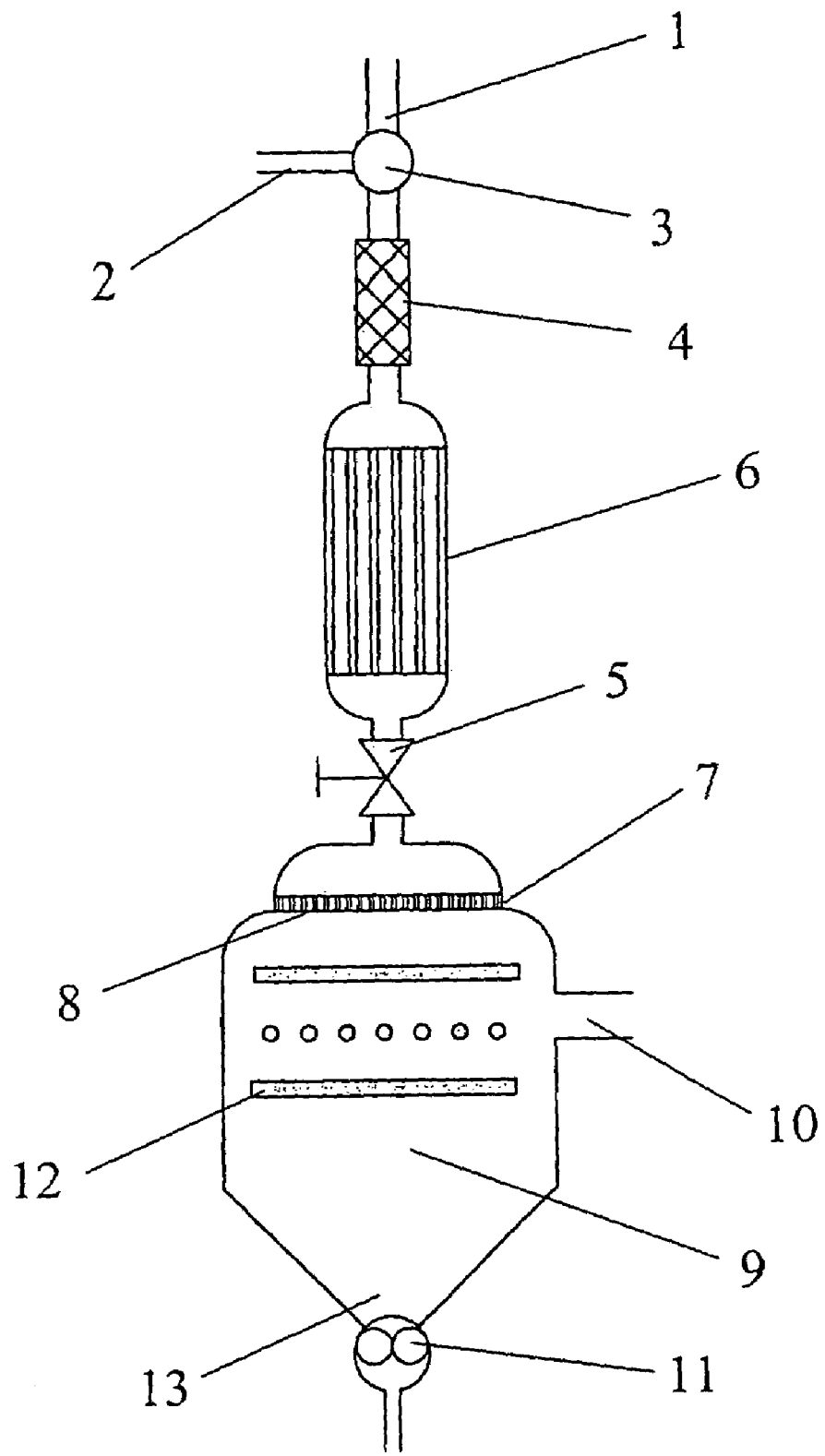
FIG. 1 shows a diagram of a first embodiment of the separating vessel for carrying out the process according to the invention

The object of the present invention is to provide a process for the preparation of polycarbonate by the melt transesterification process, in which the polycarbonate has a low residual content of monomers and other volatile constituents, such as monohydroxyaryl compounds, dihydroxyaryl compounds and dihydroxyaryl carbonates. Within the scope of the present invention, a low residual content of monomers and other volatile constituents is understood as meaning a content of less than 200 ppm, preferably less than 100 ppm. Preferably the process takes place without the addition of inhibitors, i.e. chemical components for deactivating the catalyst, or with only very small amounts of inhibitors. Small amounts of inhibitors means amounts of less than 50 ppm, preferably less than 20 ppm and particularly preferably less than 5 ppm. Preferably only slight, especially not more than 100 ppm of low molecular weight constituents, such as monohydroxyaryl compounds, dihydroxyaryl compounds and dihydroxyaryl carbonates may reform in the process, and the molecular weight of the polycarbonate may increase only slightly, i.e. by not more than 2000 g/mol., during the degassing.

The invention provides a process for the preparation of polycarbonate by the transesterification process, at least comprising the following steps:
  (a) reacting at least one dihydroxyaryl compound and a diaryl carbonate in the melt at least in the presence of a catalyst
  (b) mixing the melt obtained in step (a) with a foaming agent
  (c) degassing the melt from (b) by passing the melt through inlet openings into a separating vessel.

The process is characterised in that the degassing according to step (c) takes place with foaming, the melt being divided by the inlet openings into partial streams of from 0.1 to 20 kg/h, the temperature on entry into the inlet openings being from 250 to 340° C. and the pressure in the separating vessel being from 0.1 to 20 mbar.

The process according to the invention for the preparation of polycarbonate by the melt transesterification process according to steps (a), (b) and (c) may be discontinuous or continuous. Each of steps (a), (b) and (c) may be carried out either in one stage or in a plurality of stages.

With regard to the process technology of the process according to the invention, step (a) may be carried out under conditions known from the prior art and using the apparatus known from the prior art. The procedure according to DE 10 114 808 A or DE 10 119 851 A(=U.S. Pat. No. 6,630,563 incorporated herein by reference) may be mentioned here as an example. The continuous procedure is preferred on account of the advantageous product quality, such as uniformity of viscosity, color and end group contents.

As soon as at least one dihydroxyaryl compound and a diaryl carbonate as well as, optionally, further compounds are in the form of a melt, the reaction is started in the presence of suitable catalysts. The conversion of the transesterification reaction, or the molecular weight of the polycarbonate, is increased until the desired end product of the polymerization is reached. This may be effected, for example, in that the monohydroxyaryl compound that separates out during the polymerization is carried off by increasing temperatures and falling pressures. The nature and concentration of the end groups are determined by the choice of the ratio of dihydroxyaryl compound to diaryl carbonate, by the loss rate of the diaryl carbonate via the vapors, which is dependent on the procedure and the installation for carrying out the polymerization, as well as by any added compounds, such as, for example, higher-boiling monohydroxyaryl compounds.

The continuous process for the preparation of polycarbonates is preferably carried out in a plurality of stages, preliminary condensation of the dihydroxyaryl compound with the diaryl carbonate and, optionally, further reactants first being carried out with the use of catalysts, without the separation of the monohydroxyaryl compound that forms. The molecular weight is then built up to the desired value in a plurality of reaction evaporator stages at temperatures that increase stepwise and pressures that fall stepwise.

The devices, apparatus and reactors suitable for the individual reaction evaporator stages are sufficiently well known from the prior art. According to the process sequence they are heat exchangers, pressure-relieving apparatus, separators, columns, evaporators, stirred vessels and reactors or other apparatus which provide the necessary residence time at chosen temperatures and pressures. The chosen devices must permit the necessary introduction of heat and be so constructed that they are suitable for with the continuously increasing melt viscosities.

In a preferred continuous procedure, it is possible either to melt the reactants together or to dissolve the solid dihydroxyaryl compound in the melt of the diaryl carbonate or to dissolve the solid diaryl carbonate in the melt of the dihydroxyaryl compound. It is also possible for the dihydroxyaryl compound and the diaryl carbonate to be brought together each in the form of a melt, preferably directly from their preparation. The residence times of the raw material melts before they are combined, especially the residence time of the melt of the dihydroxyaryl compound, are adjusted to be as short as possible. The mixture of melts, on the other hand, may remain for a longer period without any losses in quality because of the lower melting point of the mixture of raw materials at correspondingly lower temperatures, compared with the individual raw materials.

The catalyst, preferably dissolved in phenol, is added to the melt. The melt is then heated to the reaction temperature. In the case of the industrially important process for the preparation of polycarbonate from 2,2-bis-(4-hydroxyphenyl)-propane and diphenyl carbonate, the temperature at the beginning is from 180 to 220° C., preferably from 185 to 210° C., very particularly preferably from 185 to 195° C. The reaction equilibrium is established within a residence time of from 15 to 90 minutes, preferably from 30 to 60 minutes, without removal of the hydroxyaryl compound that has formed. The reaction may be carried out at atmospheric pressure but also, for technical reasons, at excess pressure. The preferred pressure in industrial installations is from 2 to 15 bar absolute.

The mixture of melts is then relieved into a first vacuum chamber, the pressure of which is adjusted to from 100 to 400 mbar, preferably from 150 to 300 mbar, and directly thereafter is heated to the inlet temperature again in a suitable device, for example a tube-bundle apparatus having vertically arranged tubes, through which the product flows from top to bottom. During the relief operation, the hydroxyaryl compound that forms is evaporated off with any monomers still present. After a residence time of from 5 to 30 minutes in a sump receiver, optionally with recirculation by pumping, at the same pressure and the same temperature, the reaction mixture is relieved into a second vacuum chamber, the pressure of which is from 50 to 200 mbar, preferably from 80 to 150 mbar, and directly thereafter is heated in a suitable device, at the same pressure, to a temperature of from 190 to 250° C., preferably from 210 to 240° C., particularly preferably from 210 to 230° C. Here too, the hydroxyaryl compound that forms is evaporated off with any monomers still present. After a residence time of from 5 to 30 minutes in a sump receiver, optionally with recirculation by pumping, at the same pressure and the same temperature, the reaction mixture is relieved into a third vacuum chamber, the pressure of which is from 30 to 150 mbar, preferably from 50 to 120 mbar, and directly thereafter is heated in a suitable device, at the same pressure, to a temperature of from 220 to 280° C., preferably from 240 to 270° C., particularly preferably from 240 to 260° C. Here too, the hydroxyaryl compound that forms is evaporated off with any monomers still present. After a residence time of from 5 to 20 minutes in a sump receiver, optionally with recirculation by pumping, at the same pressure and the same temperature, the reaction mixture is relieved into a further vacuum chamber, the pressure of which is from 5 to 100 mbar, preferably from 15 to 100 mbar, particularly preferably from 20 to 80 mbar, and directly thereafter is heated in a suitable device, at the same pressure, to a temperature of from 250 to 300° C., preferably from 260 to 290° C., particularly preferably from 260 to 280° C. Here too, the hydroxyaryl compound that forms is evaporated off with any monomers still present.

The number of these reaction evaporator stages, in this case, for example, 4, may be from 2 to 6. If the number of stages is changed, the temperatures and pressures are to be correspondingly adapted in a manner known to the person skilled in the art, in order to obtain comparable results. The relative viscosity of the oligomeric carbonate achieved in these stages is from 1.04 to 1.20, preferably from 1.05 to 1.15, particularly preferably from 1.06 to 1.10.

The relative viscosity is determined as the ratio of the viscosity of a polymer solution and the viscosity of the pure solvent. It is generally determined in dichloromethane at a concentration of 5 g of polymer to one liter of solvent at 25° C.

After a residence time of from 5 to 20 minutes in a sump receiver, optionally with recirculation by pumping, at the same pressure and the same temperature as in the last flash or evaporator stage, the oligocarbonate so produced is fed into a disk or basket reactor and condensed further at from 250 to 310° C., preferably from 250 to 290° C., particularly preferably from 250 to 280° C., and at pressures of from 1 to 15 mbar, preferably from 2 to 10 mbar, and residence times of from 30 to 90 minutes, preferably from 30 to 60 minutes. The polycarbonate reaches a relative viscosity of from 1.12 to 1.28, preferably from 1.13 to 1.26, particularly preferably from 1.13 to 1.24.

The melt leaving this reactor is brought to the desired final viscosity or the desired final molecular weight in a further disk or basket reactor. The temperature is from 270 to 330° C., preferably from 280 to 320° C., particularly preferably from 280 to 310° C., and the pressure is from 0.01 to 3 mbar, preferably from 0.2 to 2 mbar, with residence times of from 60 to 180 minutes, preferably from 75 to 150 minutes. The relative viscosities are adjusted to the level required for the intended application and are from 1.18 to 1.40, preferably from 1.18 to 1.36, particularly preferably from 1.18 to 1.34.

It is also possible to carry out the polymerization of the polycarbonate oligomer in a single stage in a basket or disk reactor instead of in the two-stage procedure in two basket or disk reactors arranged one behind the other.

The vapors from all the process stages are immediately drawn off, collected and worked up. Working up is generally carried out by distillation, in order to achieve high purities of the recovered materials. This may be carried out, for example, according to DE 10 100 404 A. Recovery and isolation of the separated monohydroxyaryl compound in the most pure form possible is obvious from an economic and ecological point of view. The monohydroxyaryl compound may be used directly in the preparation of a dihydroxyaryl compound or a diaryl carbonate.

The disk or basket reactors are distinguished by the fact that, with long residence times, they provide in the vacuum a very large surface area that is constantly renewed. In terms of geometry, the disk or basket reactors are formed according to the melt viscosities of the products. Suitable reactors are described, for example, in DE 44 47 422(=U.S. Pat. No. 5,779,986 incorporated herein by reference) C2, WO 02/44244, WO 02/85967 or EP-A 1 253 163 (=U.S. Pat. No. 6,630,563 incorporated herein by reference), or twin-shaft reactors, as are described in WO 99/28 370.

The oligocarbonates, including oligocarbonates of very low molecular weight, and the polycarbonates are generally conveyed by means of gear pumps, screws of different types or displacement pumps of a special type.

Particularly suitable materials for the production of the apparatus, reactors, pipes, pumps and valves are stainless steels of the Cr Ni (Mo) 18/10 type and Ni-based alloys of type C. Stainless steels are used up to process temperatures of about 290° C., and Ni-based alloys are used at process temperatures above about 290° C.

Starting from the polycarbonate melt obtained according to step (a), a polycarbonate having a low content of low molecular weight constituents is obtained according to step (b) by the addition of a foaming agent and according to step (c) in at least one foam degassing step by division of the polycarbonate melt into partial streams as well as by lowering the pressure. Within the scope of the present invention, a low content of low molecular weight constituents is understood as meaning a content of less than 200 ppm, preferably less than 100 ppm.

The low molecular weight constituents to be removed according to step (c) include monohydroxyaryl compounds, dihydroxyaryl compounds and dihydroxyaryl carbonates, for example phenol, bisphenol A and diphenyl carbonate.

The process according to the invention allows the polycarbonate melt to be degassed by lowering of the partial pressure while largely suppressing the harmful re-formation of the monomers and without a substantial increase in the molecular weight. A maximum of 100 ppm of low molecular weight constituents are re-formed. In addition, the molecular weight of the polycarbonate increases by a maximum of 2000 g/mol. during the degassing according to step (c). Effective degassing while lowering the partial pressure with a short residence time of the melt in vacuo is possible because a foaming agent is added to the melt and the melt stream is passed through one or more inlet openings into the separating vessel (also referred to as the degassing vessel hereinbelow). By the addition of the foaming agent, the surface area of the melt is markedly increased on the one hand and on the other hand the partial pressure of the volatile substances to be removed is additionally lowered.

The foaming agent is generally a readily volatile substance having a high vapor pressure. Foaming of the polycarbonate melt is initiated by the high vapor pressure of the foaming agent. The foam brings about a considerable increase in surface area, which is advantageous for the degassing. In addition, a lowering of the partial pressure of the residues of solvent or of other volatile constituents in the polymer is effected in the gas phase of the separator, as a result of which lower residual contents of volatile constituents are in principle to be expected.

An inert gas or an inert liquid or a mixture of inert gases and/or liquids is preferably used as the foaming agent. Examples of suitable foaming agents are nitrogen, carbon dioxide, water, methane and helium. The foaming agent used is particularly preferably water, carbon dioxide or nitrogen and very particularly preferably nitrogen.

Within the scope of the present invention it has additionally been found that the success of the degassing is substantially increased if the foam degassing is carried out several times in succession. To that end, a foaming agent according to step (b) is added before each foam degassing step (c). When carrying out the degassing in several stages it must be ensured that the overall residence time remains low, in order to prevent undesirable post-polymerization, re-formation of low molecular weight substances, discoloration and degradation. A short residence time is to be achieved by a suitable configuration of the apparatus. If the foam degassing is carried out in several stages, the individual stages do not necessarily have to be carried out in exactly the same manner. Depending on the application, i.e. depending on the throughput, the viscosity of the product and the temperature, the stages may be carried out differently in respect of the division of the partial streams, the amount of foaming agent, the temperature and the diameter of the outlet openings.

In order to improve the dispersion and dissolution of the foaming agent in the polycarbonate melt, the pressure in the static mixer may be increased by a suitable device, for example a pressure-maintaining valve or a throttle. It is known to the person skilled in the art that, as the pressure increases, a larger amount of a volatile substance may be dissolved in a melt.

The foaming agent is dispersed in the polycarbonate melt in step (b). A static mixer is preferably used for dispersing and dissolving the foaming agent. Conventional embodiments of static mixers for mixing high-viscosity polycarbonate melts are sufficiently well known from the prior art. The static mixer preferably has the structure of an SMX mixer, which is described in detail, for example, in Arno Signer, Statisches Mischen in der Kunststoffverarbeitung und—herstellung, Plastverarbeiter 11 (43), 1992. Static mixers according to EP 0947239 or U.S. Pat. No. 6,394,644 B may also preferably be used. Particular preference is given to an SMX mixer who's free inside diameter varies along the mixer on account of different mixing elements, the free inside diameter very particularly preferably reducing in a cascade-like or step-like manner, for example, in the direction of flow of material through the mixer.

In order to improve the dispersion and dissolution of the foaming agent in the polycarbonate melt, the pressure in the static mixer may be increased by a suitable device, for example a pressure-maintaining valve or a throttle. It is known to the person skilled in the art that, as the pressure increases, a larger amount of a volatile substance may be dissolved in a melt.

The nature of the polycarbonate melt on entry into the inlet openings according to step (c) prior to the relieving, specifically the presence of one or more phases, is critical to the success of the degassing and the stability of the process. The degassing is particularly successful when all the volatile components, including the foaming agent, are completely dissolved before the relieving. Completely dissolved within the scope of the present invention means that the polycarbonate melt forms a single-phase mixture with the solvent contained therein and the added foaming agent. The polycarbonate melt then contains no bubbles or droplets on entry into the inlet openings.

In particular, the foaming agent that has been mixed in is preferably completely dissolved. The amount of foaming agent, the pressure and the temperature are so chosen that the foaming agent is completely dissolved in the polycarbonate melt. The pressure and temperature necessary for the complete dissolution of a particular amount of foaming agent depend on the nature of the foaming agent. It is known to the person skilled in the art that, at a given temperature of a polycarbonate melt, the maximum soluble amount of a foaming agent increases as the pressure rises.

The foaming agent is so chosen that only small amounts are sufficient to bring about considerable foaming of the polycarbonate melt after pressure relieving on entry into the inlet openings. Within the scope of the process according to the invention, a small amount means that from 0.01 to 1 wt. % foaming agent, based on the polymer mass, is added to the melt, particularly preferably from 0.02 to 0.5 wt. %, very particularly preferably from 0.05 to 0.3 wt. %. Despite this small amount of foaming agent, the relieving is carried out with foaming of the polycarbonate melt.

The vapor pressure of the foaming agent for the temperature prevailing at the entry into the inlet openings of the degassing step (c) at the established concentration of foaming agent in the melt is from 1 to 100 bar, preferably from 2 to 60 bar and particularly preferably from 10 to 40 bar.

Before, during or after the addition of the foaming agent, the polycarbonate melt may be heated or cooled, preferably heated. An elevated temperature means an elevated vapor pressure of the volatile components, so that the formation of foam in the subsequent degassing is assisted and separation of the volatile constituents is simpler. Suitable apparatus for heating or cooling a polycarbonate melt are known to the person skilled in the art, for example tubular heat exchangers, plate heat exchangers or heat exchangers having static mixers.

Preferably, the temperature change in the melt from the point of addition of the foaming agent to entry into the inlet openings according to step (c) is not more than 100° C., preferably not more than 90° C. The temperature of the polycarbonate melt on entry into the inlet openings is preferably from 250° C. to 340° C., particularly preferably from 260° C. to 320° C. Further heating of the polycarbonate melt after entry into the inlet openings to entry into the degassing vessel is also possible if, for example, heatable tubes are used as the inlet openings and relieving members. The temperature difference between the entry into the inlet openings and the entry into the separating vessel is preferably not more than 100° C., particularly preferably not more than 80° C.

According to step (c), the polycarbonate melt is introduced into a separating vessel through inlet openings in partial streams of from 0.1 to 20 kg/h, preferably from 0.125 to 10 kg/h and particularly preferably from 0.15 to 5 kg/h.

The polycarbonate melt is relieved into a separating vessel having a low pressure of from 0.1 to 20 mbar, preferably from 0.3 to 10 mbar, particularly preferably from 0.5 to 5 mbar. According to the invention, the temperature of the polycarbonate melt on entry into the degassing vessel is from 250 to 340° C., preferably from 260 to 320° C. and particularly preferably from 270 to 300° C.

The polycarbonate melt is introduced into the separating vessel through the inlet openings from above. Accordingly, the inlet openings are located in the upper region of the separating vessel. The inlet openings are arranged in particular in one plane, but they may also be arranged in different planes in the upper region of the separating vessel.

The inlet openings act as relieving members. An important design criterion for these relieving members is the pressure loss produced thereby. The pressure loss is given by the viscosity of the polymer melt, which is dependent on the product type, temperature and the concentration of volatile constituents and foaming agent, the throughput and the geometry of the relieving members. The relationship between the diameter of the bore, the weight flow rate, the viscosity of the polycarbonate melt and the pressure loss is known to the person skilled in the art. When interpreting the pressure loss, the person skilled in the art may disregard the effect of the entraining agent, so that an interpretation according to known rules of technology is possible. The pressure loss is such that the absolute pressure before entry into the inlet openings is sufficiently high to prevent foaming before entry into the inlet openings. Foaming does not take place until the melt has entered the inlet openings.

Suitable inlet openings are, for example, bores or slots, called nozzles hereinafter, in a plate (also referred to as the nozzle plate). Nozzles are preferably in the form of bores in a nozzle plate. The plate may in principle have any thickness.

In a preferred embodiment of the process according to the invention, the partial streams of the polycarbonate melt are each guided through nozzles in a plate arranged horizontally. The bores open directly into the separating vessel, in which a low pressure prevails. Preferred nozzle diameters are from 0.8 to 5 mm, particularly preferably from 1 to 4 mm.

Tubes may also be used as the inlet openings. The tubes are preferably arranged vertically, and the polycarbonate melt flows through them from top to bottom.

Preferred tube diameters are from 4 to 20 mm, particularly preferably from 5 to 15 mm.

In a further preferred embodiment of the process according to the invention, the tubes are used as a heat exchanger. To that end they are in particular in the form of a parallel bundle and are surrounded by a heat-transfer medium, preferably a liquid heat-transfer oil or condensing water vapour or heat-transfer oil vapour. The length of the tubes is preferably from 300 to 2500 mm, particularly preferably from 500 to 2000 mm.

The tubes of the tubular heat exchanger accordingly open directly into the separating vessel. The individual tubes are so formed that the polycarbonate melt is not yet foaming as it enters the tubular heat exchanger. The tubes may be narrowed by nozzles, in order to maintain a given pressure loss. The pressure loss in an individual tube is dependent on the nature of the polymer, the temperature at the inlet and outlet of the tube, the throughput and the proportion of volatile constituents at the inlet and at the outlet of the tube. The polymer foam forms only at the outlet side of the tubes to the separator, i.e. at the inlet openings of the separating vessel. The diameters of the tubes are preferably from 4 to 20 mm, particularly preferably from 5 to 15 mm. Nozzles, which are used to increase the pressure loss, have diameters of from 0.8 to 5 mm, preferably from 1 to 4 mm. The mass flow rate per tube is from 0.1 to 20 kg/h.

Carrying out the process according to the invention using a tubular heat exchanger provides a preferred method of heating or cooling the polymer melt, as described hereinbefore.

The distances between the inlet openings, measured from mid-point to mid-point, and accordingly the distances between the partial streams on entry into the separating vessel, are from 5 to 50 mm, preferably from 10 to 40 mm and particularly preferably from 15 to 25 mm.

The residence time of the polycarbonate melt in the separating vessel must on the one hand be sufficiently great to allow adequate degassing. On the other hand, however, it must not be too great, so as not to impair the quality of the polycarbonate. The residence time of the melt in the separating vessel in step (c) is preferably not more than 10 minutes, particularly preferably not more than 5 minutes.

In a further embodiment of the process according to the invention, the residence time may be influenced by guide elements. The function of the guide elements is to lengthen the residence time and at the same time increase the surface area of the polycarbonate melt.

The guide elements may be in the form of perforated sheets, profiled sheets, wires, wire netting, link chains, narrow metal strips having any desired cross-section and the like, the guide elements preferably being arranged substantially horizontally. Examples of such guide elements are described, for example, in DE-A 10144233 (=U.S. Pat. No. 6,761,797 incorporated herein by reference) or in EP-A 1095960 (=U.S. Pat. No. 6,265,526 incorporated herein by reference). It is particularly preferred for the guide elements to be in the form of wires which are arranged substantially horizontally in the separating vessel. Degassing of the polycarbonate melt is considerably improved thereby, without the occurrence of harmful back-cleavage of the polycarbonate.

The wires may be arranged virtually as desired, as long as the wires do not touch one another and are arranged substantially horizontally. Substantially horizontally within the scope of the present invention means a maximum deviation from the horizontal of 20°. In particular, two or more wires should not touch one another, for example by crossing. It is possible, for example, to provide a plurality of wires in a plurality of planes, neither the wires of one plane nor the wires of different planes touching one another. If a plurality of wires is provided in a plane, they may be arranged substantially parallel to one another. The wires of a plane preferably have an angle of not more than 20°. Moreover, if a plurality of planes of wires are provided, the wires of different planes may be at any desired angle relative to one another. The wires of different planes preferably form an angle of not more than 180°, particularly preferably of from 30 to 150°, very particularly preferably of from 70 to 110°. If the individual wires of a plane are not stretched in parallel, the twisting angle of the wires of different planes is determined by means of the median line.

Preference is given to wires having a diameter of from 1 mm to 5 mm, particularly preferably from 2 mm to 4 mm.

The advantage of wires that are arranged substantially horizontally and are preferably stretched between opposing walls of the separating vessel is that, with a minimal contact area between the metal material of the wire and the polycarbonate melt, effective surface renewal and hence good exchange of material between the gas space and the polycarbonate melt may take place. With vertically arranged wires, a major hold-up of highly viscous polymer melt may form in unfavourable cases, i.e. the polymer melt builds up on the wires. This leads to unfavorable residence time divisions or to degradation of the polymer as well as to an increase in the molecular weight and the reformation of volatile constituents. All this may be detrimental to the quality of the product. Experiments have also shown that a network, net, knitted structure or the like of wires, as described, for example, in EP-A 1 095 960, has a tendency to produce a major hold-up of polycarbonate melt at the junctions of the wires, leading to degradation of the polymer. In addition, as compared with sheets and the like, horizontally stretched wires bring about good separation of the foam strands and accordingly an effectively increased surface area for the exchange of material.

A higher viscosity of the polycarbonate melt leads, with otherwise identical guide elements, to a major hold-up, to greater layer thicknesses and longer residence times.

In the separating vessel, the polycarbonate melt falls downwards into a sump and is drawn off from there by a suitable discharge member, for example a gear pump or a discharge extruder. Discharge is preferably carried out by means of a gear pump. The bottom of the separating vessel is preferably in conical form with the tip pointing downwards. The angle of the cone relative to the horizontal is preferably from 20 to 60°, particularly preferably from 30 to 45°. In the case of very high throughputs (for example greater than 12 tons per hour), it is also possible to choose a construction in which the bottom of the separating vessel includes a plurality of cones, each of which has a discharge member at its deepest point.

The low molecular weight compounds separated off in step (c) may be freed of the foaming agent and fed to working-up. The volatile constituents separated off thereby, a considerable proportion of which includes the diaryl carbonate used in the process, may be fed back into the process for the preparation of the polycarbonate.

In the process according to the invention, furthermore, the concentration of phenolic OH groups in the polycarbonate obtained in step (a) is preferably from 100 to 450 ppm.

The catalyst in step (a) is preferably deactivated to the extent of at least 80 wt. %, especially deactivated by heat. The activity of the catalyst is so reduced thereby that the reaction is largely prevented from continuing in step (b).

In order to avoid a further reaction in step (c), it is also possible in a preferred embodiment of the invention to add an inhibitor to the melt. This is carried out especially when the catalyst in step (a) has not been deactivated to the extent of at least 80 wt. %. Inhibitors are understood to be compounds that inhibit the kinetics of chemical reactions in a decisive manner. Quality-reducing changes to the polymer may thus be avoided. For example, it is necessary to add inhibitors after the preparation of polymers, which still contain monomers and reaction products once the polymerisation reaction is complete, in order to reduce the content of low molecular weight compounds by thermal processes.

Suitable inhibitors for polycarbonate prepared by the melt transesterification process are preferably acid components, such as Lewis or Brönstedt acids, or esters of strong acids. The pKa value of the acid is preferably not greater than 5, preferably less than 3. Examples of suitable acid components are: ortho-phosphoric acid, phosphorous acid, pyrophosphoric acid, hypophosphoric acid, polyphosphoric acids, benzenephosphonic acid, sodium dihydrogen phosphate, boric acid, arylboronic acids, hydrochloric acid (hydrogen chloride), sulfuric acid, ascorbic acid, oxalic acid, benzoic acid, salicylic acid, formic acid, acetic acid, adipic acid, citric acid, benzenesulfonic acid, toluenesulfonic acid, dodecylbenzenesulfonic acid and all other phenyl-substituted benzenesulfonic acids, nitric acid, terephthalic acid, isophthalic acid, stearic acid and other fatty acids, acid chlorides such as chloroformic acid phenyl ester, stearic acid chloride, acetoxy-BP-A, benzoyl chloride, and also esters, semi-esters and bridged esters of the above-mentioned acids, such as, for example, toluenesulfonic acid esters, phosphoric acid esters, phosphorous acid esters, phosphonic acid esters, dimethyl sulfate, boric acid esters, arylboronic acid esters and other components that generate acid under the influence of water, such as tri-iso-octylphosphine, Ultranox 640 and BDP (bisphenol diphosphate oligomer).

There are preferably suitable ortho-phosphoric acid, phosphorous acid, pyro-phosphoric acid, hypophosphoric acid, polyphosphoric acids, benzenephosphonic acid, sodium dihydrogen phosphate, boric acid, arylboronic acids, benzoic acid, salicylic acid, benzenesulfonic acid, toluenesulfonic acid, dodecylbenzenesulfonic acid and all other phenyl-substituted benzenesulfonic acids, acid chlorides such as chloroformic acid phenyl ester, stearic acid chloride, acetoxy-BP-A, benzoyl chloride, and also esters, semi-esters and bridged esters of the above-mentioned acids, such as, for example, toluenesulfonic acid esters, phosphoric acid esters, phosphorous acid esters, phosphonic acid esters, boric acid esters, arylboronic acid esters and other components that generate acid under the influence of water, such as tri-iso-octylphosphine, Ultranox 640 and BDP.

There are particularly preferably suitable ortho-phosphoric acid, pyrophosphoric acid, polyphosphoric acids, benzenephosphonic acid, benzoic acid, benzenesulfonic acid, toluenesulfonic acid, dodecylbenzenesulfonic acid and all other phenyl-substituted benzenesulfonic acids, and also esters, semi-esters and bridged esters of the above-mentioned acids, such as, for example, toluenesulfonic acid esters, phosphoric acid esters, phosphorous acid esters, phosphonic acid esters and other components that generate acid under the influence of water, such as tri-iso-octylphosphine, Ultranox 640 and BDP. Very particular preference is given to the use of ortho-phosphoric acid, pyrophosphoric acid, benzenesulfonic acid, toluenesulfonic acid, dodecylbenzenesulfonic acid and all other phenyl-substituted benzenesulfonic acids, and also esters, semi-esters and bridged esters of the above-mentioned acids, such as, for example, toluenesulfonic acid esters and phosphoric acid esters.

The inhibitor may be added in solid, liquid or gaseous form. In a preferred procedure, the acidic component as inhibitor is added continuously and homogeneously to the product stream, which is to be freed of monomers, for example, in the preparation process directly after the desired final molecular weight has been reached, so that evaporation of the residual monomers may begin immediately thereafter. In a particularly preferred procedure, the addition of additives to improve individual product properties is carried out after the addition of the acid and the evaporation and is not combined with the evaporation step, because additives are often used that are volatile in a vacuum, which is essential for the evaporation, and are then difficult to adjust to the necessary concentrations in the polymer. The acidic components are preferably added in liquid form. Because the amounts to be added are very small, solutions of the acidic components are preferably used. Suitable solvents are those which do not interfere with the process, are chemically inert and evaporate rapidly. Examples of suitable solvents are water or methanol.

The table below shows, by way of example, the concentrations of volatile constituents in various polycarbonate samples prepared by the melt transesterification process according to step (a). Phenol is the monohydroxyaryl compound, diphenyl carbonate (DPC) is the diaryl carbonate and BPA (bisphenol A) is the dihydroxyaryl compound.

| Relative viscosity | ppm OH end groups | ppm phenol | ppm DPC | ppm BPA |
|---|---|---|---|---|
| 1.2 | 330 | 65 | 570 | 5 |
| 1.2 | 500 | 95 | 520 | 12 |
| 1.295 | 300 | 35 | 190 | 4 |
| 1.295 | 400 | 45 | 170 | 8 |

The present invention also provides the thermoplastic polycarbonates obtainable by the process according to the invention. They have residual contents of less than 100 ppm carbonic acid diesters, less than 50 ppm hydroxyaryl compounds and less than 10 ppm dihydroxyaryl compounds, an extremely low content of cations and anions of in each case not more than 60 ppb, preferably not more than 40 ppb and particularly preferably not more than 20 ppb (calculated as Na cation), the cations present being alkali and alkaline earth metal cations, which originate as impurities from the raw materials used and the phosphonium and ammonium salts. Other ions, such as Fe, Ni, Cr, Zn, Sn, Mo, Al ions and their homologues, may be present in the raw materials or originate from the materials of the installation that is used by abrasion or corrosion. The total content of such ions is not more than 2 ppm, preferably not more than 1 ppm and particularly preferably not more than 0.5 ppm.

In order to achieve minimal amounts of impurities in the polycarbonate, highly pure raw materials are used. Such pure raw materials are obtainable, for example, only by purification processes such as recrystallisation, distillation, precipitation with washing and the like.

The anions that are present are anions of inorganic acids and of organic acids in equivalent amounts (e.g. chloride, sulfate, carbonate, phosphate, phosphite, oxalate, etc.).

The polycarbonates are also distinguished by the fact that they contain no detectable amounts of incorporated cleavage or decomposition products with reactive end groups, which are formed during the transesterification process. Such cleavage or decomposition products are, for example, isopropenylmonohydroxyaryls or dimers thereof.

The weight average molecular weights that are obtained are from 15,000 to 40,000 g/mol., preferably from 18,000 to 36,000 g/mol., particularly preferably from 18,000 to 34,000 g/mol., the molecular weight being determined via the relative viscosity. In particular, polycarbonates having a relative viscosity of from 1.18 to 1.22 are obtainable by the process according to the invention.

The content of OH end groups in the polycarbonates obtainable according to the invention is from 100 to 450 ppm, preferably from 150 to 400 ppm, particularly preferably from 200 to 350 ppm.

The polycarbonates obtained by the process according to the invention may be provided with conventional additives (e.g. functional additives and reinforcing agents) for the purpose of changing their properties. The addition of additives and agents serves to lengthen their useful life (e.g. hydrolysis or degradation stabilizers), to improve their color stability (e.g. heat and UV stabilizers), to simplify processing (e.g. mold release agents, flow improvers), to improve their properties in use (e.g. antistatics), to improve their flame resistance, to influence the visual impression (e.g. organic colorants, pigments) or to adapt the properties of the polymers to particular stresses (impact modifiers, finely divided minerals, fiberous materials, quartz flour, glass fibers and carbon fibers).

The diaryl carbonates suitable for the reaction with the dihydroxyaryl compounds are those of the formula

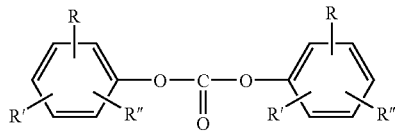

wherein R, R' and R" each independently of the other represents H, optionally branched $C_1$–$C_{34}$-alkyl/cycloalkyl, $C_7$–$C_{34}$-alkylaryl or $C_6$–$C_{34}$-aryl and the two sides may be different. R may also represent —COO—R'", wherein R'" may be H, optionally branched $C_1$–$C_{34}$-alkyl/cycloalkyl, $C_7$–$C_{34}$-alkylaryl or $C_6$–$C_{34}$-aryl.

Such diaryl carbonates are, for example: diphenyl carbonate, methylphenyl-phenyl carbonates and di-(methylphenyl) carbonates, also in the form of a mixture, wherein the position of the methyl group on the phenyl rings may be as desired, as well as dimethylphenyl-phenyl carbonates and di-(dimethylphenyl) carbonates, also in the form of a mixture, wherein the position of the methyl groups on the phenyl rings may be as desired, 4-ethylphenyl-phenyl carbonate, di-(4-ethylphenyl) carbonate, 4-n-propylphenyl-phenyl carbonate, di-(4-n-propylphenyl) carbonate, 4-isopropylphenyl-phenyl carbonate, di-(4-isopropylphenyl) carbonate, 4-n-butylphenyl-phenyl carbonate, di-(4-n-butylphenyl) carbonate, 4-isobutylphenyl-phenyl carbonate, di-(4-isobutylphenyl) carbonate, 4-tert.-butylphenyl-phenyl carbonate, di-(4-tert.-butylphenyl) carbonate, 4-n-pentylphenyl-phenyl carbonate, di-(4-n-pentylphenyl) carbonate, 4-n-hexylphenyl-phenyl carbonate, di-(4-n-hexylphenyl) carbonate, 4-isooctylphenyl-phenyl carbonate, di-(4-isooctylphenyl) carbonate, 4-nonylphenyl-phenyl carbonate, di-(4-n-nonylphenyl) carbonate, 4-cyclohexylphenyl-phenyl carbonate, di-(4-cyclohexylphenyl) carbonate, 4-(1-methyl-1-phenylethyl)-phenyl-phenyl carbonate, di-[4-(1-methyl-1-phenylethyl)-phenyl] carbonate, biphenyl-4-yl-phenyl carbonate, di-(biphenyl-4-yl) carbonate, 4-(i-naphthyl)-phenyl-phenyl carbonate, 4-(2-naphthyl)-phenyl-phenyl carbonate, di-[4-(1-naphthyl)phenyl] carbonate, di-[4-(2-naphthyl)phenyl] carbonate, 4-phenoxyphenyl-phenyl carbonate, di-(4-phenoxyphenyl) carbonate, 3-pentadecylphenyl-phenyl carbonate, di-(3-pentadecylphenyl) carbonate, 4-tritylphenyl-phenyl carbonate, di-(4-tritylphenyl) carbonate, methylsalicylate-phenyl carbonate, di-(methylsalicylate) carbonate, ethylsalicylate-phenyl carbonate, di-(ethylsalicylate) carbonate, n-propylsalicylate-phenyl carbonate, di-(n-propylsalicylate) carbonate, isopropylsalicylate-phenyl carbonate, di-(isopropylsalicylate) carbonate, n-butylsalicylate-phenyl carbonate, di-(n-butylsalicylate) carbonate, isobutylsalicylate-phenyl carbonate, di-(isobutyl-salicylate) carbonate, tert.-butylsalicylate-phenyl carbonate, di-(tert.-butyl-salicylate) carbonate, di-(phenylsalicylate) carbonate and di-(benzylsalicylate) carbonate.

Preferred diaryl compounds are: diphenyl carbonate, 4-tert.-butylphenyl-phenyl carbonate, di-(4-tert.-butylphenyl) carbonate, biphenyl-4-yl-phenyl carbonate, di-(biphenyl-4-yl) carbonate, 4-(1-methyl-i -phenylethyl)-phenyl-phenyl carbonate and di-[4-(1-methyl-1-phenylethyl)-phenyl] carbonate.

Diphenyl carbonate is particularly preferred.

The diaryl carbonates may also be used with residual contents of the monohydroxyaryl compounds from which they were prepared. The contents may be up to 20%, preferably 10%, particularly preferably 5% and very particularly preferably up to 2%.

Based on the dihydroxyaryl compound, the diaryl carbonates are used in an amount of from 1.02 to 1.30 mol., preferably from 1.04 to 1.25 mol., particularly preferably from 1.06 to 1.22 mol., very particularly preferably from 1.06 to 1.20 mol., per mole of dihydroxyaryl compound. It is also possible to use mixtures of the above-mentioned diaryl carbonates.

In order to influence or change the end groups it is additionally possible to use a monohydroxyaryl compound which has not been used to prepare the diaryl carbonate used. It is represented by the following general formula:

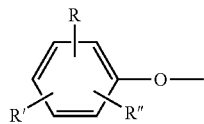

wherein R, R' and R" are defined in connection with the diaryl carbonates but R in this particular case may not be H, although R' and R" may be H.

Such monohydroxyaryl compounds are, for example: 1-, 2- or 3-methylphenol, 2,4-dimethylphenol, 4-ethylphenol, 4-n-propylphenol, 4-isopropylphenol, 4-n-butylphenol, 4-isobutylphenol, 4-tert.-butylphenol, 4-n-pentylphenol, 4-n-hexylphenol, 4-isooctylphenol, 4-n-nonylphenol, 3-pentadecylphenol, 4-cyclohexylphenol, 4-(1-methyl-1-phenyl-ethyl)-phenol, 4-phenylphenol, 4-phenoxyphenol, 4-(1-naphthyl)-phenol, 4-(2-naphthyl)-phenol, 4-tritylphenol, methyl salicylate, ethyl salicylate, n-propyl salicylate, isopropyl salicylate, n-butyl salicylate, isobutyl salicylate, tert.-butyl salicylate, phenyl salicylate and benzyl salicylate.

Preference is given to: 4-tert.-butylphenol, 4-isooctylphenol and 3-pentadecyl-phenol.

Suitable monohydroxyaryl compound has its boiling point above that of the monohydroxyaryl compound used to prepare the diaryl carbonate that is employed. The monohydroxyaryl compound may be added at any time during the reaction. It is preferably added at the beginning of the reaction or at any desired point during the reaction. The amount of free monohydroxyaryl compound may be from 0.2 to 20 mol. %, preferably from 0.4 to 10 mol. %, based on the dihydroxyaryl compound.

The end groups may also be changed by the concomitant use of a diaryl carbonate whose base monohydroxyaryl compound has a higher boiling point than the base monohydroxyaryl compound of the diaryl carbonate that is mainly used. Here too, the diaryl carbonate may be added at any time during the reaction. It is preferably added at the beginning of the reaction or at any desired point during the reaction. The proportion of the diaryl carbonate having the higher-boiling base monohydroxyaryl compound in the total amount of diaryl carbonate used may be from 1 to 40 mol. %, preferably from 1 to 20 mol. % and particularly preferably from 1 to 10 mol. %.

Dihydroxyaryl compounds suitable for the preparation of polycarbonates are those of the formula

HO-Z-OH in which Z is an aromatic radical having from 6 to 30 carbon atoms which may contain one or more aromatic nuclei, may be substituted and may contain aliphatic or cycloaliphatic radicals or alkylaryls or hetero atoms as bridging members.

Examples of dihydroxyaryl compounds are: dihydroxybenzenes, dihydroxy-diphenyls, bis-(hydroxyphenyl)-alkanes, bis-(hydroxyphenyl)-cycloalkanes, bis-(hydroxyphenyl)-aryls, bis-(hydroxyphenyl) ethers, bis-(hydroxyphenyl) ketones, bis-(hydroxyphenyl) sulfides, bis-(hydroxyphenyl)-sulfones, bis-(hydroxyphenyl) sulfoxides, 1,1'-bis-(hydroxyphenyl)-diisopropylbenzenes and their compounds alkylated and halogenated at the nucleus.

Further suitable dihydroxyaryl compounds are known from the prior art.

Preferred dihydroxyaryl compounds are, for example: resorcinol, 4,4'-dihydroxy-diphenyl, bis-(4-hydroxyphenyl)-methane, bis-(3,5-dimethyl-4-hydroxyphenyl)-methane, bis-(4-hydroxyphenyl)-diphenyl-methane, 1,1-bis-(4-hydroxyphenyl)-1-phenyl-ethane, 1,1-bis-(4-hydroxyphenyl)-1-(1-naphthyl)-ethane, 1,1-bis-(4-hydroxyphenyl)-1-(2-naphthyl)-ethane, 2,2-bis-(4-hydroxyphenyl)-propane, 2,2-bis-(3-methyl-4-hydroxyphenyl)-propane, 2,2-bis-(3,5-dimethyl-4-hydroxyphenyl)-propane, 2,2-bis-(4-hydroxyphenyl)-1-phenyl-propane, 2,2-bis-(4-hydroxyphenyl)-hexafluoro-propane, 2,4-bis-(4-hydroxyphenyl)-2-methyl-butane, 2,4-bis-(3,5-dimethyl-4-hydroxyphenyl)-2-methyl-butane, 1,1-bis-(4-hydroxyphenyl)-cyclohexane, 1,1-bis-(3,5-dimethyl-4-hydroxyphenyl)-cyclohexane, 1,1-bis-(4-hydroxyphenyl)-4-methyl-cyclohexane, 1,1-bis-(4-hydroxyphenyl)-3,3,5-trimethyl-cyclohexane, 1,3-bis-[2-(4-hydroxyphenyl)-2-propyl]-benzene, 1,1'-bis-(4-hydroxyphenyl)-3-diisopropyl-benzene, 1,1'-bis-(4-hydroxyphenyl)-4-diisopropyl-benzene, 1,3-bis-[2-(3,5-dimethyl-4-hydroxyphenyl)-2-propyl]-benzene, bis-(4-hydroxyphenyl) ether, bis-(4-hydroxyphenyl) sulfide, bis-(4-hydroxyphenyl)-sulfone, bis-(3,5-dimethyl-4-hydroxyphenyl)-sulfone and 2,2',3,3'-tetrahydro-3,3,3',3'-tetramethyl-1,1'-spirobi-[1H-indene]-5,5'-diol.

Particularly preferred dihydroxyaryl compounds are: resorcinol, 4,4'-dihydroxy-diphenyl, bis-(4-hydroxyphenyl)-diphenyl-methane, 1,1-bis-(4-hydroxyphenyl)-1-phenyl-ethane, bis-(4-hydroxyphenyl)-1-(1-naphthyl)-ethane, bis-(4-hydroxy-phenyl)-1-(2-naphthyl)-ethane, 2,2-bis-(4-hydroxyphenyl)-propane, 2,2-bis-(3,5-dimethyl-4-hydroxyphenyl)-propane, 1,1-bis-(4-hydroxyphenyl)-cyclohexane, 1,1-bis-(3,5-dimethyl-4-hydroxyphenyl)-cyclohexane, 1,1-bis-(4-hydroxyphenyl)-3,3,5-trimethyl-cyclohexane, 1,1'-bis-(4-hydroxyphenyl)-3-diisopropyl-benzene and 1,1'-bis-(4-hydroxyphenyl)-4-diisopropyl-benzene.

Very particular preference is given to: 4,4'-dihydroxy-diphenyl, 2,2-bis-(4-hydroxyphenyl)-propane and bis-(4-hydroxyphenyl)-3,3,5-trimethyl-cyclohexane.

It is possible to use either one dihydroxyaryl compound, with the formation of homopolycarbonates, or a plurality of dihydroxyaryl compounds, with the formation of copolycarbonates.

Instead of the monomeric dihydroxyaryl compounds it is also possible to use low molecular weight, predominantly OH-end-group-stopped oligocarbonates as the starting compound.

The dihydroxyaryl compounds may also be used with residual contents of the monohydroxyaryl compounds from which they were prepared, or the low molecular weight oligocarbonates with residual contents of the monohydroxyaryl compounds which were split off in the preparation of the oligomers. The contents may be up to 20%, preferably 10%, particularly preferably up to 5% and very particularly preferably up to 2%.

The polycarbonates may be branched in a specific manner. Suitable branching agents are the compounds having three or more functional groups, preferably those having three or more hydroxyl groups, that are known for the preparation of polycarbonates.

Examples of some of the compounds having three or more phenolic hydroxyl groups that may be used are: phloroglucinol, 4,6-dimethyl-2,4,6-tri-(4-hydroxyphenyl)-2-heptene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol and tetra-(4-hydroxyphenyl)-methane.

Some of the other trifunctional compounds are: 2,4-dihydroxybenzoic acid, trimesic acid, cyanuric chloride and 3,3-bis-(3-methyl-4-hydroxyphenyl)-2-oxo-2,3-dihydroindole.

The branching agents are used in amounts of from 0.02 to 3.6 mol. %, based on the dihydroxyaryl compound.

Preferred branching agents are: 3,3-bis-(3-methyl-4-hydroxyphenyl)-2-oxo-2,3-dihydroindole and 1,1,1-tri-(4-hydroxyphenyl)-ethane.

The catalysts used in the melt transesterification process for the preparation of polycarbonates are the basic catalysts known in the literature, such as, for example, alkali and alkaline earth hydroxides and oxides, as well as ammonium or phosphonium salts, referred to as onium salts hereinbelow. Onium salts are preferably used in the synthesis, particularly preferably phosphonium salts. Phosphonium salts within the scope of the invention are those of the general formula:

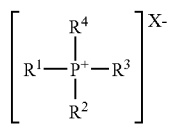

wherein $R^{1-4}$ may be identical or different $C_1$–$C_{10}$-alkyls, $C_6$–$C_{14}$-aryls, $C_7$–$C_{15}$-arylalkyls or $C_5$–$C_6$-cycloalkyls, preferably methyl or $C_6$–$C_{14}$-aryls, particularly preferably methyl or phenyl, and $X^-$ may be an anion such as hydroxide, sulfate, hydrogen sulfate, hydrogen carbonate, carbonate or a halide, preferably chloride, or an alkylate or arylate of the formula —OR, wherein R may be a $C_6$–$C_{14}$-aryl, $C_7$–$C_{15}$-arylalkyl or $C_5$–$C_6$-cycloalkyl, preferably phenyl.

Preferred catalysts are tetraphenylphosphonium chloride, tetraphenylphosphonium hydroxide and tetraphenylphosphonium phenolate; tetraphenylphosphonium phenolate is particularly preferred.

They are preferably used in amounts of from $10^{-8}$ to $10^{-3}$ mol., based on one mole of dihydroxyaryl compound, particularly preferably in amounts of from $10^{-7}$ to $10^{-4}$ mol.

Further catalysts may be used on their own or in addition to the onium salt as co-catalyst, in order to increase the rate of the polycondensation.

These include alkaline-reacting salts of alkali metals and alkaline earth metals, such as hydroxides, alkoxides and aryl oxides of lithium, sodium and potassium, preferably hydroxides, alkoxides or aryl oxides of sodium. Most preferred are sodium hydroxide and sodium phenolate, as well as the disodium salt of 2,2-bis-(4-hydroxyphenyl)-propane.

The amounts of the alkaline-reacting salts of alkali metals and alkaline earth metals, on their own or as a co-catalyst, may be in the range of from 1 to 500 ppb, preferably from 5 to 300 ppb and most preferably from 5 to 200 ppb, in each case calculated as sodium and based on polycarbonate to be formed.

The alkaline-reacting salts of alkali metals and alkaline earth metals may be used during the preparation of the oligocarbonates, that is to say at the beginning of the synthesis, or they may be added before the polycondensation, in order to suppress undesirable secondary reactions.

It is also possible to add supplementary amounts of onium catalysts of the same type or of a different type before the polycondensation.

The catalysts are added in solution, in order to avoid harmful excess concentrations during the addition. The solvents are compounds that are inherent in the system and in the process, such as, for example, dihydroxyaryl compounds, diaryl carbonates or monohydroxyaryl compounds. Monohydroxyaryl compounds are particularly preferred, because it is known to the person skilled in the art that dihydroxyaryl compounds and diaryl carbonates readily change and decompose even at slightly elevated temperatures, especially under the action of catalysts. The qualities of the polycarbonates suffer as a result. In the industrially important transesterification process for the preparation of polycarbonate, the preferred compound is phenol. Phenol is also highly suitable because the catalyst that is preferably used, tetraphenylphosphonium phenolate, is isolated during the preparation in the form of a mixed crystal with phenol.

Figure 2:
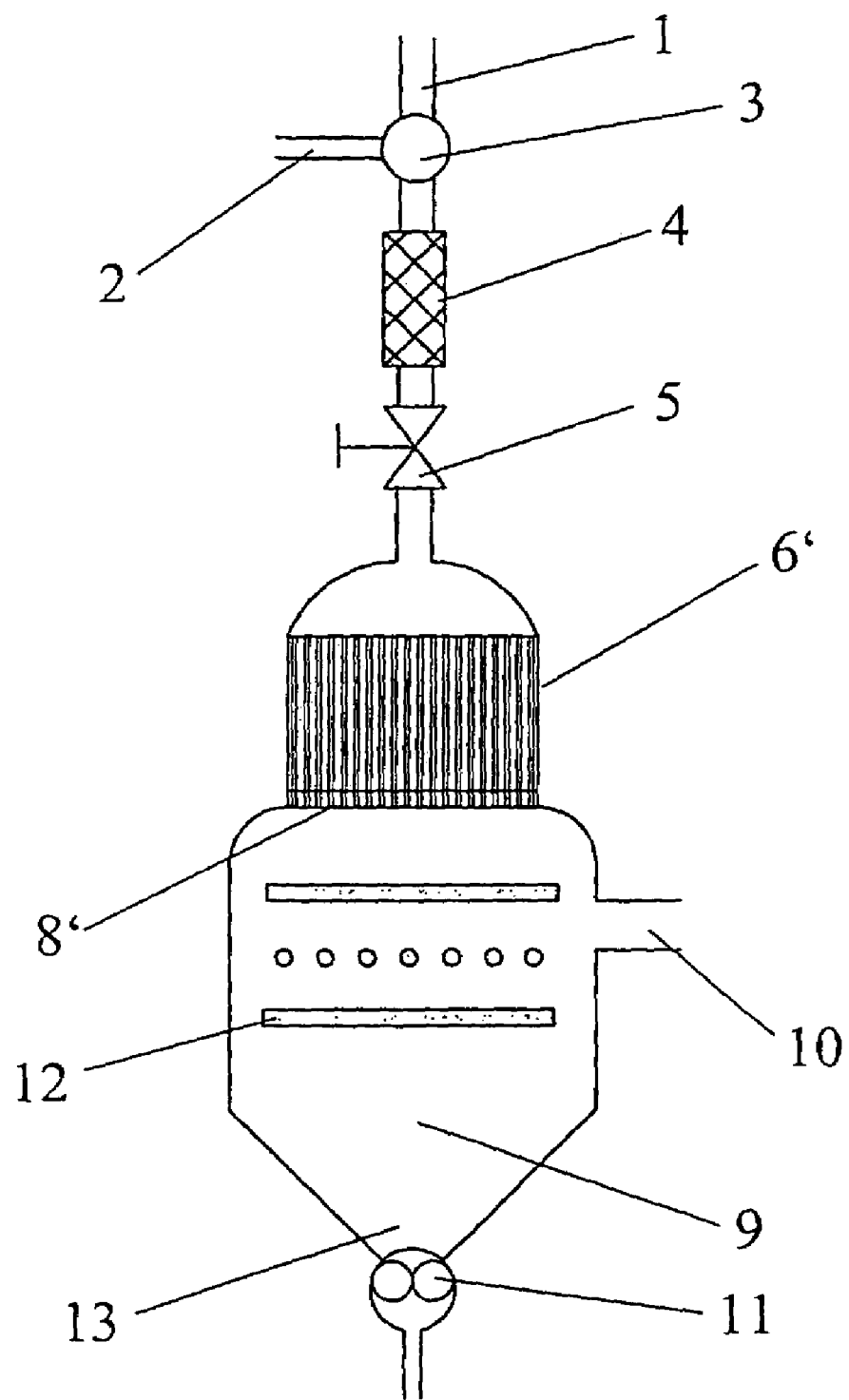
FIG. 2 shows a diagram of a second embodiment of the separating vessel.

The invention is explained in greater detail hereinbelow with reference to the accompanying drawings, in which:

FIG. 1 shows a diagram of a first embodiment of the separating vessel for carrying out the process according to the invention FIG. 2 shows a diagram of a second embodiment of the separating vessel.

FIG. 1 shows a separating vessel 9 which has in its upper region a horizontally arranged plate 7 with inlet openings 8. The separating vessel 9 has an outlet 10 for the volatile constituents as well as a downwardly directed conical outlet 13 in the lower region, which outlet 13 is provided with a discharge device 11. Guide elements in the form of wires 12 are provided inside the separating vessel 9. The wires 12 are arranged substantially horizontally, a plurality of wires 12 in each case forming a plane. The wires of a plane are arranged substantially parallel to one another. A plurality of planes of such parallel wires 12 are provided (3 planes in FIG. 1), the wires of two planes located one above the other being substantially at a right angle to one another.

The polycarbonate melt is supplied to the separating vessel 9 via a supply pipe 1. Foaming agent is mixed into the polycarbonate melt by means of a supply pipe 2 via a metering device 3. The polycarbonate/foaming agent mixture is passed first through a static mixer 4 and then through a heat exchanger 6. The melt flows onto the plate 7 with the inlet openings 8 via a pressure-maintaining valve 5. The melt is divided into partial streams thereby. The partial streams of the melt pass into the separating vessel 9 via the inlet openings 8. The degassed polycarbonate melt is drawn off at the bottom of the conical outlet 13 of the separating vessel 9 via the discharge device 11.

In contrast to the embodiment shown in FIG. 1, FIG. 2 shows in the upper region of the separating vessel 9 a vertically arranged heat exchanger 6' in the form of a tubular heat exchanger. The downwardly directed tubes constitute the inlet openings 8'.

According to FIG. 2, the polycarbonate melt is supplied to the separating vessel 9 via a supply pipe 1. Foaming agent is mixed into the polycarbonate melt by means of a supply pipe 2 via a metering device 3. The polycarbonate/foaming agent mixture is first passed through a static mixer 4. The melt then flows via a pressure-maintaining valve 5 into the inlet openings 8' of a tubular heat exchanger 6', the melt stream being divided into a plurality of partial streams thereby. The inlet openings 8' open into the separating vessel 9. The degassed polycarbonate melt is drawn off at the bottom of the conical outlet 13 of the separating vessel 9 via the discharge device 11.

EXAMPLES

The following tests were carried out on polycarbonates of bisphenol A. The volatile component to be removed was diphenyl carbonate.

The guide elements consisted of ten horizontally arranged wires each having a diameter of 3 mm, stretched beneath the inlet opening at a distance of 10 cm from one another. Two wires arranged one above the other were rotated by 90° in the horizontal.

Table 1 summarises the process conditions and the test results. In Table 1, mass flow rate per opening means the mass flow rate of a partial stream. The terms entraining agent and foaming agent are used synonymously. The separating vessel is referred to as the separator and abbreviated to "sep.". The guide elements are referred to as baffles and the inlet openings as nozzles. The temperature is the temperature on entry into the inlet opening. In column 8, the condition of the foaming agent on entry into the inlet opening is described.

Table 1 shows that no foaming agent is used in Examples Nos. 3, 4, 7, 10, 13 and 17. The volatile component diphenyl carbonate is therefore removed only very inadequately.

In Examples 1 and 2, the foaming agent is not completely dissolved on entry into the inlet opening. This results in poorer degassing as compared with Examples 8, 9, 11 and 12, in which the foaming agent is dissolved on entry into the inlet opening.

Examples 14, 15, 16 and 18, 19 and 20 show the particular advantage of the guide elements.

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. A process for producing polycarbonate comprising
   (a) reacting in the melt at least one aromatic dihydroxy compound with diaryl carbonate in the presence of a catalyst to obtain polycarbonate melt, and
   (b) mixing the polycarbonate melt with a foaming agent to obtain a mixture and
   (c) passing the mixture at 250 to 340° C. through inlet openings of a separating vessel at a rate of 0.1 to 20 kg/hour, to obtain a plurality of streams of foamed polycarbonate and degassing the streams of foamed polycarbonate in the separating vessel wherein the pressure is 0.1 to 20 mbar.

2. The process of claim 1 further comprising completely dissolving the foaming agent in the mixture on its passing through the inlet openings.

3. The process of claim 1 wherein the foaming agent is at least one member selected from the group consisting of water, carbon dioxide and nitrogen.

4. The process of claim 1 wherein the polycarbonate melt referred to in (a) has a concentration of 100 to 450 ppm of phenolic OH groups.

5. The process of claim 1 wherein the residence time of the polycarbonate in the separating vessel is not more than 10 minutes.

TABLE 1

| No. | Mass flow rate per opening kg/h | Foaming agent | Amount of entraining agent | Temperature ° C. | Sep. pressure mbar | Entry pressure bar | Foaming agent entry | Nozzle length mm | Nozzle/tube diameter mm | Heat exchanger | Rel. viscosity | Baffles | Residual DPC content inlet ppm | Residual DPC content outlet ppm |
|---|---|---|---|---|---|---|---|---|---|---|---|---|---|---|
| 1 | 5 | N2 | 0.1% | 292 | 2 | 6.2 | not dissolved | 1150 | 10 | yes | 1.196 | no | 600 | 194 |
| 2 | 5 | N2 | 0.1% | 290 | 2 | 6.4 | not dissolved | 1150 | 10 | yes | 1.196 | no | 600 | 178 |
| 3 | 5 | — | 0.0% | 290 | 2 | 5.5 | — | 1150 | 10 | yes | 1.196 | no | 600 | 337 |
| 4 | 2 | — | 0.0% | 290 | 1 | 35.3 | — | 100 | 3 | no | 1.203 | no | 400 | 285 |
| 5 | 2 | N2 | 0.1% | 290 | 1 | 34.2 | dissolved | 100 | 3 | no | 1.205 | no | 400 | 155 |
| 6 | 2 | N2 | 0.2% | 290 | 1 | 38.1 | dissolved | 100 | 3 | no | 1.208 | no | 400 | 100 |
| 7 | 1 | — | 0.0% | 290 | 0.6 | 15.1 | — | 300 | 4 | yes | 1.2 | no | 500 | 295 |
| 8 | 1 | N2 | 0.1% | 290 | 1 | 14.8 | dissolved | 300 | 4 | yes | 1.2 | no | 500 | 125 |
| 9 | 1 | N2 | 0.2% | 290 | 1.1 | 16.1 | dissolved | 300 | 4 | yes | 1.2 | no | 500 | 128 |
| 10 | 1 | — | 0.0% | 270 | 0.7 | 30.5 | — | 300 | 4 | yes | 1.2 | no | 500 | 300 |
| 11 | 1 | N2 | 0.1% | 270 | 1 | 27.7 | dissolved | 300 | 4 | yes | 1.2 | no | 500 | 145 |
| 12 | 1 | N2 | 0.2% | 270 | 1.2 | 27.7 | dissolved | 300 | 4 | yes | 1.2 | no | 500 | 130 |
| 13 | 5 | — | 0.0% | 290 | 1 | 27.8 | — | 50 | 3.5 | no | 1.2 | yes | 550 | 175 |
| 14 | 5 | N2 | 0.1% | 290 | 1.1 | 22.6 | dissolved | 50 | 3.5 | no | 1.2 | yes | 550 | 115 |
| 15 | 5 | N2 | 0.2% | 290 | 0.8 | 23.1 | dissolved | 50 | 3.5 | no | 1.2 | yes | 550 | 50 |
| 16 | 5 | N2 | 0.3% | 290 | 1 | 23 | dissolved | 50 | 3.5 | no | 1.2 | yes | 550 | 55 |
| 17 | 3 | — | 0.0% | 270 | 0.8 | 15.2 | — | 50 | 3.5 | no | 1.2 | yes | 550 | 125 |
| 18 | 3 | N2 | 0.1% | 270 | 0.8 | 13.7 | dissolved | 50 | 3.5 | no | 1.2 | yes | 550 | 30 |
| 19 | 3 | N2 | 0.2% | 270 | 0.8 | 14.5 | dissolved | 50 | 3.5 | no | 1.2 | yes | 550 | 30 |
| 20 | 3 | N2 | 0.3% | 270 | 0.7 | 14.1 | dissolved | 50 | 3.5 | no | 1.2 | yes | 550 | 35 |

6. The process of claim 1 wherein at least 80 wt % of the catalyst is deactivated before said (b).

7. The process of claim 6 further comprising adding a catalyst inhibitor.

8. The process of claim 1 wherein the separating vessel contains a plurality of guide elements that are arranged substantially horizontally.

* * * * *